Figure 1:
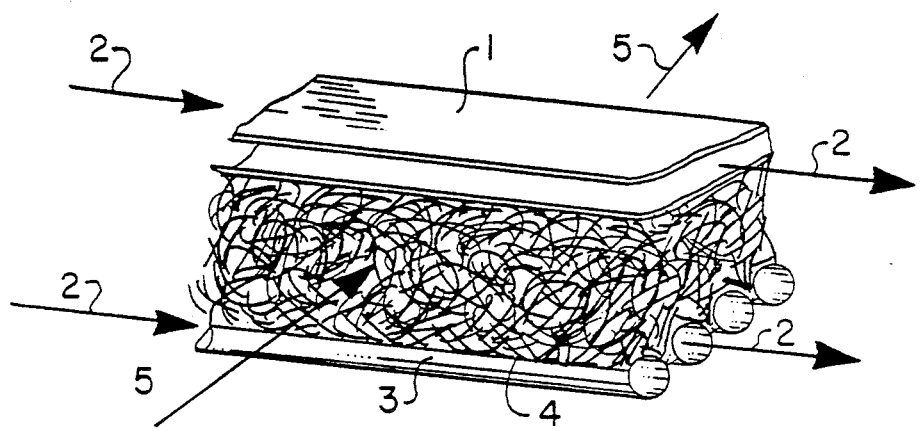

United States Patent [19]

Malmström et al.

[11] Patent Number: 5,141,720
[45] Date of Patent: Aug. 25, 1992

[54] CATALYST BED FOR EXOTHERMAL REACTIONS BETWEEN GASES AND/OR OTHER FLUIDS

[75] Inventors: Rolf Malmström, Helsinki, Finland; Stig Petersson, Skelleftehamn, Sweden

[73] Assignee: A. Ahlstrom Osakeyhtio, Karhula, Finland

[21] Appl. No.: 639,394

[22] Filed: Jan. 10, 1991

Related U.S. Application Data

[63] Continuation of Ser. No. 265,323, Oct. 27, 1988, abandoned, which is a continuation of Ser. No. 21,093, Mar. 3, 1987, abandoned.

[30] Foreign Application Priority Data

Mar. 3, 1986 [FI] Finland ................. 860893

[51] Int. Cl.⁵ .................................. B01J 8/08
[52] U.S. Cl. ............................. 422/200; 422/201; 422/202; 422/219; 165/907
[58] Field of Search ........... 422/145, 146, 173, 198, 422/200–202, 219; 165/907

[56] References Cited

U.S. PATENT DOCUMENTS

| | | | |
|---|---|---|---|
| 1,396,358 | 11/1921 | Cochrane | 422/202 |
| 2,401,797 | 6/1946 | Rasmussen | 165/907 |
| 2,655,437 | 10/1953 | Garbo | 422/145 X |
| 2,751,756 | 6/1956 | Hughes et al. | 422/146 X |
| 3,184,493 | 5/1965 | Kunze et al. | 422/146 X |
| 3,359,753 | 12/1967 | Fiedler et al. | 165/907 |
| 3,431,083 | 3/1969 | Bergstrand | 422/202 |
| 3,857,680 | 12/1974 | Porta et al. | 422/200 |
| 4,088,450 | 5/1978 | Kosaka et al. | 422/201 |
| 4,371,033 | 2/1983 | Stendahl | 422/146 |
| 4,420,462 | 12/1983 | Clyde | 422/201 |

FOREIGN PATENT DOCUMENTS

| | | | |
|---|---|---|---|
| 2357631 | 5/1975 | Fed. Rep. of Germany | 422/202 |
| 3012476 | 10/1980 | Fed. Rep. of Germany | |
| 3414717 | 10/1985 | Fed. Rep. of Germany | |
| 760992 | 9/1980 | U.S.S.R. | 422/202 |
| 1401472 | 7/1975 | United Kingdom | |

OTHER PUBLICATIONS

Combustion y Combustibles—Chilean article.

*Primary Examiner*—Jill Johnston
*Attorney, Agent, or Firm*—Pennie & Edmonds

[57] ABSTRACT

A catalyst bed for conducting exothermal reactions between gases and/or other fluids is disclosed. The catalyst bed includes at least two cooling elements arranged in parallel relationship with each other. A space is thereby defined between the two cooling elements, and one opening at each opposite end of the cooling elements is also defined by the arrangement of cooling elements. The space created is adapted to receive a catalyst mass through either of the openings. The cooling elements cool the gases and/or other fluids, as well as the catalyst mass to keep the reaction temperature low enough to maintain a desired state of equilibrium.

10 Claims, 1 Drawing Sheet

CATALYST BED FOR EXOTHERMAL REACTIONS BETWEEN GASES AND/OR OTHER FLUIDS

This is a continuation of application Ser. No. 07/265,323, filed Oct. 27, 1988, and now abandoned which in turn is a continuation of application Ser. No. 07/021,093, filed Mar. 3, 1987, and now abandoned.

The present invention relates generally to a catalyst bed and, more specifically, to a catalyst bed that is particularly suitable for exothermal reactions between gases and/or other fluids.

In a variety of reactions between inorganic gases and/or other fluids, an equilibrium desirable for the reaction is achieved only at lower temperatures. However, the lower reaction temperatures can result in a reduction in the rate of reaction, requiring the use of catalysts in one form or another.

In several of the reaction steps which occur when gases and/or other fluids are reacted heat is produced, i.e., the reactions are exothermal. Reactions such as the oxidation of $SO_2$ into $SO_3$ during the preparation of sulfuric acid or reactions between $SO_2$ and $CO$, $H_2$ and/or $COS$ during the reduction of $SO_2$ gases into elementary sulphur typify the type of exothermal reactions contemplated.

Since $SO_2$ gas will be obtained by the combusion of sulphides with air in these reaction systems, a great number of the reaction gases will consist of $N_2$. This means that a considerable portion of the produced heat will be used for the heating of nitrogen in the exothermal catalytic reactions. Thus, a temperature increase which would otherwise adversely affect the state of equilibrium may be avoided.

The fact that modern technology has introduced the use of oxygen gas both in chemistry and metallurgy, has raised new questions in these catalytic processes. The use of oxygen gas essentially reduces the gas volumes and leads to considerably smaller device units. Simultaneously, it leads to the disappearance of the balancing effect of nitrogen and, as a result, the reaction gases are heated to temperatures having a considerable affect on the equilibrium of the reactions and possibly also on the durability of the catalyst masses (both chemical and mechanical).

In order to avoid these problems, the temperature of the catalyst masses, and primarily of the gas, has to be controlled. It is therefore an object of the present invention to achieve a catalyst bed for exothermal reactions between gases and/or other fluids by using cooling coils for indirect temperature control of the catalyst bed, and an inlet and an outlet for the catalyst mass.

Thus, the present invention relates to a catalyst bed for conducting exothermal reactions between gases and/or other fluids which comprises at least two cooling elements arranged in parallel relationship with respect to each other, thereby defining a space between said at least two cooling elements, and one opening disposed at each opposite end of the cooling elements. These openings provide access to and egress from the thus defined space. The space is adapted to accommodate a catalyst mass and the gases and/or other fluids to undergo reaction. When the catalyst mass and/or other fluids are disposed within the space, the cooling elements will maintain the temperature of the catalyst mass and the gases and/or other fluids at a level which is conducive to obtaining and maintaining the desired state of equilibrium. The cooling elements also serve to substantially define the limits of the catalyst bed.

The catalyst bed of the present invention enables one to achieve the advantage of being able to freely transport the catalyst mass from the inlet of the catalyst bed to its outlet without disturbing the cooling elements, i.e., the catalyst mass can either intermittently or continuously be removed from the bed for regeneration and reintroduction into the catalyst bed.

However, the cooling cannot take place under any conditions. Specifically, the cooling has to take place indirectly, since the advantage attained by the use of oxygen gas is otherwise lost. Secondly, the wall temperatures of the cooling surfaces have to be maintained at temperatures that do not cause condensation or corrosion, or an irregular temperature distribution, which would retard the reactions. As the amount of heat evolved during the reaction is considerable, it is desirable to recover it in some high-quality form. To this end, the cooling of the catalyst mass may, for instance, be carried out by means of cooled panels, whereby a regular surface temperature may be achieved by correctly choosing an appropriate steam pressure when steam is employed as the cooling medium. The cooling of the catalyst mass then occurs by means of an appropriate number of cooling panels, which are disposed in a manner so as to yield an appropriate ratio between the gas, the catalyst mass and the cooling surface. In accordance with the present invention this is achieved by the catalyst bed being defined by the cooling elements.

Besides using steam water with an appropriate pressure as a cooling medium, other solutions are possible. For instance, air with or without pressure, organic cooling liquids, etc.

In most instances, catalyst beds typically include a high-pressure steam system, thus allowing this type of cooling to be easily adapted to the existing system.

Figure 2:
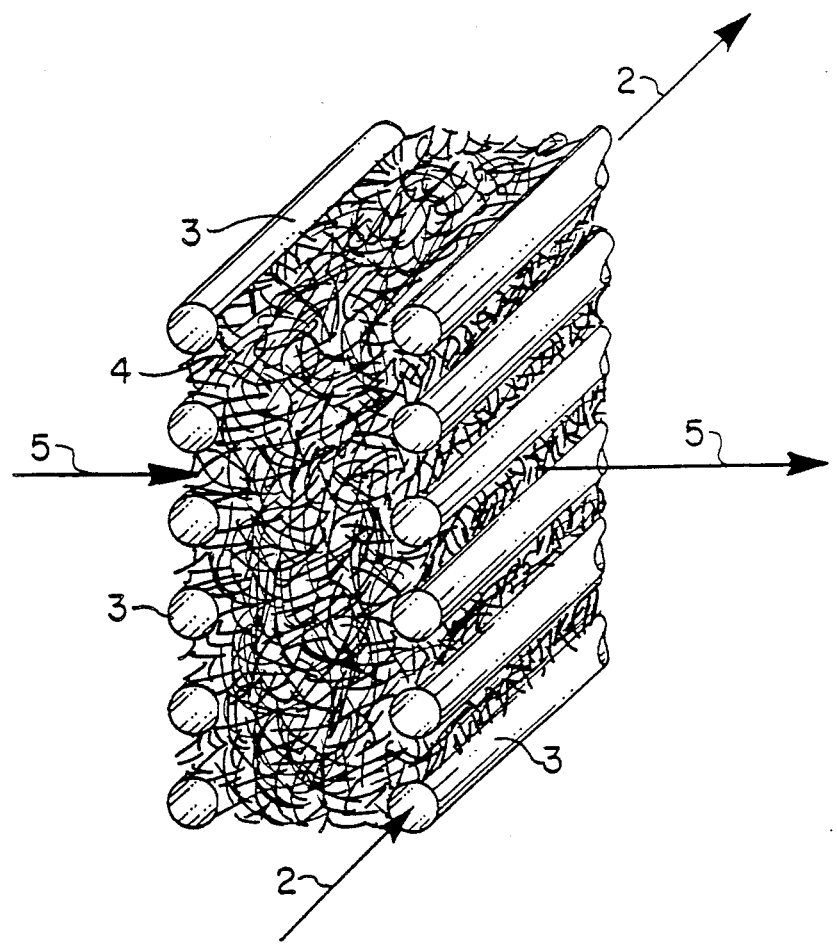

The invention is described in detail below with reference to the enclosed drawing and example. In the drawing, FIGS. 1 and 2 illustrate two preferred embodiments of a catalyst bed according to the invention.

In the figures, reference numeral 1 denotes a cooling panel through which the cooling medium 2 flows, 3 denotes parallel cooling tubes which are regularly spaced, and 4 denotes the catalyst bed through which a mixture 5 of the reacting gases or liquids flows.

In all these cases, the ratio of the catalyst volume, the gas amount, as well as the reaction temperature, the cooling surface and the temperature thereof must be determined for each type of process. The temperature of the cooling surface is critical when the control of the reaction conditions and that of condensation and corrosion effects are considered.

EXAMPLE 1

A gas that has been obtained by reducing $SO_2$ is cooled to 450° C. whereby the equilibrium at approximately 1200° C. becomes permanent. The individual components of the gas and the percent concentration of each component are given below in Table I.

The cooled gas is conducted through a catalyst bed which consists of a porous $Al_2O_3$ based catalyst mass in lumps. The gas then reacts against equilibrium. The exothermal reactions bring about a temperature rise which would correspond to a temperature rise of approximately 500° C., i.e., up to a gas temperature of approximately 950° C. However, as such a temperature rise produces a displacement of the equilibrium, the desired state of equilibrium is not achieved and part of the gas components remain unreacted. At a temperature of 830° C., the gas composition appearing in Table II is obtained.

The desired gas composition, which appears below in Table III, is obtained only by cooling the gas and the catalyst itself to 450° C., which was carried out indirectly with high-pressure steam employed as the cooling medium.

TABLE I

| Component | % of Component Present In Gas |
| --- | --- |
| $CO_2$ | 33.0 |
| CO | 16.0 |
| $H_2$ | 4.0 |
| $H_2O$ | 20.0 |
| $SO_2$ | 11.0 |
| $H_2S$ | 2.0 |
| $S_2$ | 10.0 |
| COS | 0.5 |

TABLE II

| Component | % of Component Present In Gas |
| --- | --- |
| $CO_2$ | 47.0 |
| CO | 5.0 |
| $H_2$ | 1.0 |
| $H_2O$ | 14.0 |
| $SO_2$ | 7.0 |
| $H_2S$ | 9.0 |
| $S_2$ | 9.0 |
| COS | 0.5 |

TABLE III

| Component | % of Component Present In Gas |
| --- | --- |
| $CO_2$ | 53.0 |
| CO | 0.5 |
| $H_2$ | 0.1 |
| $H_2O$ | 15.0 |
| $SO_2$ | 6.0 |
| $H_2S$ | 11.0 |
| $S_2$ | 9.0 |
| COS | 0.35 |

EXAMPLE 2

In catalytic oxidation of pure $SO_2$ with a stoichiometric amount of oxygen gas at a temperature of 425° C. a yield of 97.5% of sulfuric acid is obtained with a simple catalyst, provided that the catalyst is cooled. If the catalyst is uncooled, the reaction degree will sink to approximately 40% as the temperature in this case will rise to approximately 700° C. Such a proceeding is unthinkable, since the catalyst materials used for this purpose do not resist temperatures above 500° C. The only possible course of action is then a cooled catalyst according to the present invention.

What is claimed is:

1. A catalyst bed containing a catalyst mass for conducting exthermal reactions between gases or other fluids which comprises at least two cooling elements containing a cooling medium for maintaining the temperature of the catalyst mass and the gases or other fluids at a level which is conducive to obtaining and maintaining a desirable state of equilibrium, said cooling elements being arranged in parallel relationship with respect to each other, thereby defining a space between said cooling elements, a porous lump of catalyst mass disposed in and completely filling said space and through which gases or other fluids are adapted to be fed between said cooling elements to undergo said exothermal reactions, a first opening in communication with said space and disposed at one end of said cooling elements for providing access to said space for the introduction of catalyst mass into said space, a second opening in communication with said space and disposed at the opposite end of said cooling elements and spaced from said first opening, said first and second openings lying in spaced parallel planes perpendicular to a longitudinal axis of said cooling elements and defining between said openings a straight path, said second opening providing an egress from said space for removal of said catalyst mass therefrom by movement of said mass along said straight path, and said space and each of said openings having substantially equal cross-sectional size as measured along said parallel planes.

2. The catalyst bed of claim 1 wherein at least one of said cooling elements includes a plurality of cooling tubes.

3. The catalyst bed of claim 2 wherein said cooling tubes are regularly spaced parallel cooling tubes.

4. The catalyst bed of claim 2 wherein said plurality of cooling tubes are at least partially embedded within said catalyst mass when said catalyst mass is disposed within said space.

5. The catalyst bed of claim 2 wherein the cooling tubes extend in a direction perpendicular to the direction of flow of gases or other fluids through the catalyst bed.

6. The catalyst bed of claim 1 wherein at least one of said cooling elements includes at least one flat cooling panel.

7. The catalyst bed of claim 1 wherein said cooling medium includes steam, air or an organic cooling liquid.

8. The catalyst bed of claim 1 wherein the straight path between said first and second openings and along which said catalyst mass is transported through said space extends in a direction perpendicular to the direction of flow of gases or other fluids through the catalyst bed.

9. A catalyst bed for conducting exothermal reactions between gases or other fluids, comprising:
   a porous lump catalyst mass;
   at least two spaced parallel cooling elements defining the limits of the catalyst bed and accommodating in the space therebetween said catalyst mass; and
   an inlet and an outlet in communication with said space and disposed at opposite ends of a straight path extending between the inlet and outlet and along which the porous lump catalyst mass is transported from said inlet to said outlet during said exothermal reactions and without disturbing the cooling elements; said straight path between said inlet and outlet and along which said catalyst mass is transported extending in a direction perpendicular to the direction of a flow of gases or other fluids through the catalyst bed.

10. A catalyst bed containing a catalyst mass for conducting exothermal reactions between gases or other fluids which comprises at least two cooling elements for maintaining the temperature of the catalyst mass and the gases or other fluids at a level which is conducive to obtaining and maintaining a desirable state of equilibrium, said cooling elements being arranged in parallel relationship with respect to each other, thereby defining a space between said cooling elements, a porous nonfluidized lump of catalyst mass disposed in and completely filling said space and through which gases or other fluids are adapted to be fed between said cooling elements to undergo said exothermal reactions, said mass having a first mass end defined by a portion of the mass located at one end of said cooling elements and a second mass end defined by a portion of the mass located at an opposite end of said cooling elements, a first opening in communication with said space and disposed at one end of said cooling elements for providing access to said space for the introduction of additional catalyst mass into said space to replenish and form a continuation of said porous lump at said first mass end, a second opening in communication with said space and disposed at the opposite end of said cooling elements and spaced from said first opening, said first and second openings lying in spaced parallel planes perpendicular to a longitudinal axis of said cooling elements and defining between said openings a straight path, said second opening providing an egress from said space for removal of said catalyst mass therefrom by movement of said mass along said straight path and with said second mass end being removed as the first mass end is being replenished.

* * * * *